Figure 1:
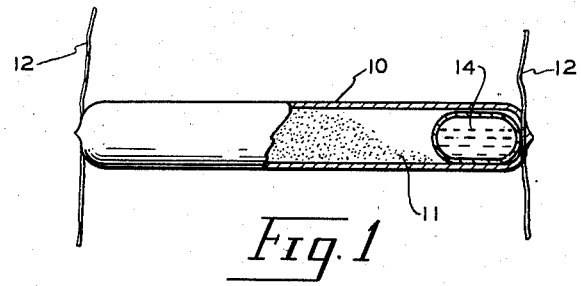

April 2, 1957  M. J. COHEN  2,787,269

CONTAINER FOR PRESERVING MEDICAMENTS

Filed July 13, 1951

INVENTOR
MILTON J. COHEN

BY Frank W. Dahn

ATTORNEY

United States Patent Office 2,787,269
Patented Apr. 2, 1957

2,787,269
CONTAINER FOR PRESERVING MEDICAMENTS
Milton J. Cohen, Washington, D. C.
Application July 13, 1951, Serial No. 236,501
5 Claims. (Cl. 128—272)

My invention relates to means and methods for preparing, preserving and applying a medicament for the purpose of relieving pain due to dental cavities and for temporary plugging or sealing of deciduous teeth, although it is not necessarily limited to such uses. The invention finds its usefulness particularly in connection with the preparation of such mixtures as consist of substances that are stable until mixed, but then deteriorate rapidly, as by hardening so that they can no longer be utilized. Thus, it is a well known practice in dentistry to use a paste composed of eugenol (a substance fully described in the U. S. Pharmacopeia) and zinc oxide for relief of toothache and as a temporary filling that hardens upon application and exposure to air and the effects of saliva so as to form a temporary filling that protects dental cavities from further irritation and pain. The use of such a paste has heretofore been limited due to the fact that it hardens so quickly that it must be used promptly after mixing.

It is an object of my invention to provide a container that will preserve the ingredients of a mixture separately and safely until they are to be combined and applied to a cavity, the eugenol being in liquid form and the zinc oxide being a powder and each being in a separate airtight container that protects it from all deleterious agents.

Another object is to provide a container that will permit the ingredients of the paste to be commingled intimately and thoroughly when needed, and which may preferably be mixed by the use of only one hand and without any machine or mechanical device whatever, the pressure of the hand breaking the container for the liquid and the tube being subsequently kneaded to form a paste.

Another object is to provide means in the nature of an applicator that shall serve to apply the paste forcibly and accurately where needed, as in a dental cavity, while maintaining the paste out of contact with the atmosphere or any other contaminant up to substantially the moment of application.

Another object is to provide appliances that are not subject to deterioration by dampness or other climatic conditions and which will preserve the ingredients separately but in relation for ready and complete commingling without the use of tools, while also permitting ready and accurate dispensing by simple means.

Figure 2:
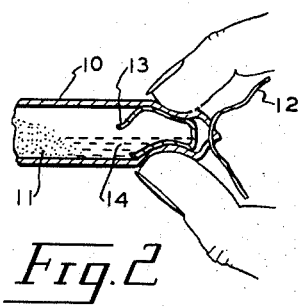
Figure 3:
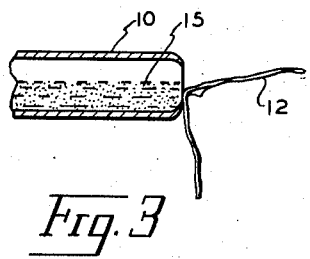
Figure 4:
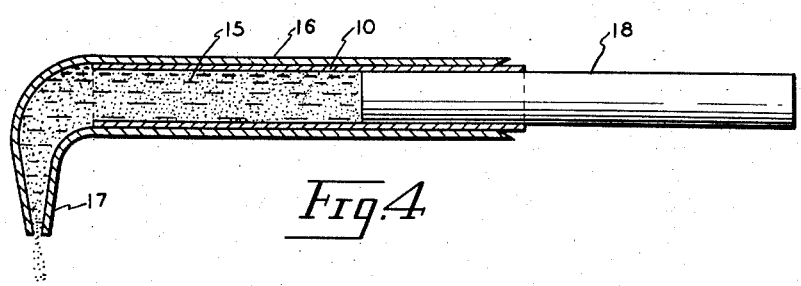

Referring now to the annexed drawings, which are made a part of this application and in which similar reference characters indicate similar parts:

Fig. 1 is a longitudinal section of a container forming part of my invention,

Fig. 2, a similar view of part of a container, illustrating a step forming part of my invention, Fig. 3, a similar view illustrating another step forming part of my invention, and Fig. 4, an elevation, partly in section, illustrating a final step in the process and forming part of my invention.

In the drawings, reference character 10 indicates a tube preferably cylindrical in shape and consisting of a tough, flexible material that is preferably but not necessarily transparent. The tube contains material 11 in powdered form, which material is zinc oxide as an illustration for one use of my invention. The material of the tube is sufficiently tough to permit kneading of the tube for purposes to be described, without danger of rupturing the same. At each end of the tube there is a ripcord or tape 12, 12, embedded in the material of the tube so as to break open the ends of the tube when pulled out of the wall of the same. It is however obviously feasible to open the ends of the tube by cutting with a knife or a pair of scissors in case of need.

In addition to the powder indicated at 11 there is a capsule 13 inside the tube, which capsule is or may be freely movable in the tube and which capsule is made of material that is flexible but is more frangible than that of the tube, so that the capsule may be broken open by pressure that does not harm the tube. This end may be reached in various ways, as by making the capsule of similar but thinner sheet material than the tube, or by nicking some part of the capsule or by making it of rubber or the like elastic material with a pinprick therein such as can open to permit the contained liquid to emerge and will then re-close to retain the remaining fluid. This tube contains liquid 14, which for dental purposes may be eugenol. Both the liquid and the powder are in compartments that may be considered as hermetically sealed, thereby protecting the contents against dampness, mold, and any other thing that might reduce their effectiveness.

The container comprising the tube and the capsule may be preserved indefinitely, regardless of weather or climate. When the contents are to be used the first step is to compress the tube or a part of the same so as to break the capsule and release the liquid therein. Upon rupture of the capsule the liquid runs out and contacts the powder 11. Now the tube is kneaded in any convenient manner between the fingers of the user so as to intermingle the ingredients thoroughly, forming a paste. Preferably the ingredients are present in measured quantities, so as to produce the best results, and they form a paste indicated at 15 in Fig. 3.

Now the rip cords are pulled to open the ends of the tube and the tube is inserted into the cylindrical barrel 16 of an applicator having a reduced angularly located end portion 17 with an outlet that is relatively small as compared with the diameter of the barrel for the purpose of directing the stream of paste flowing from the applicator and for insuring that the same shall issue under sufficient pressure to fill cavities properly. For this purpose also, the plunger of the applicator, shown at 18, is made to fit closely in the barrel 10 and is relatively large as compared with the size of the exit passage. Obviously the paste can be forced out by opening only one end of the tube and inserting it into the applicator with the opened end nearest to the outlet, but with greater danger of waste.

The other rip cord is removed before using the plunger, or the ends of the tube may be slit, as above stated, and the cavity is filled, or several may be filled from the contents of one tube, depending on the size of the cavities.

For cleanliness and good appearance all parts of the invention may be made of suitable plastic material, i. e., the plunger and the barrel may be of some rigid material that shall not be easily damaged by conditions of use, the tube must be flexible and tough, and the capsule must be capable of resistance to chemical or mechanical action of the liquid to be contained therein, while tough enough to stand up under its conditions of use and capable of being ruptured by pressure such as will not damage the tube.

It will be obvious to those skilled in the art that many changes may be made in the apparatus and methods herein disclosed, all without departing from the spirit of the invention; and therefore I do not limit myself to what is shown in the drawings and described in the specification, but only as indicated in the appended claims.

While I do not limit myself to the use of any specific materials for the capsule and tube the tube can be made of vinylite or pliable latex rubber or other flexible material that is sufficiently strong and preferably transparent or at least translucent, while the capsule may be composed of gelatin or other frangible plastic such that it will be broken by a pressure that does not injure the tube. The rip cords are to be sealed in when the tube is closed, and this may be done by heating the ends of the tube which should then be of thermoplastic or thermosetting material. It will be noted that the barrel of the applicator is of one-piece construction and so is the plunger.

Having thus fully described my invention, what I claim is:

1. A container for elements of a medicament comprising a capsule for liquid, said capsule being composed of frangible material, a tube containing the capsule and also containing a powder that forms a settable paste when mixed with the liquid in the capsule, and rip cords in the wall of the tube at opposite ends of the same.

2. A device as in claim 1, wherein the material of the capsule is such as can be ruptured by the pressure of the hand, whereas the material of the tube is of relatively tough such as permits of kneading the tube and its contents to mingle the liquid thoroughly with the powder after breaking the capsule.

3. A device as in claim 1, wherein the material of the capsule is relatively frangible plastic and that of the tube is relatively tough plastic.

4. A device as in claim 1, wherein the liquid is eugenol and that powder is zinc oxide.

5. A container for incompatible elements of a medicament including a capsule of readily frangible material for containing a fluid, and a cylindrical tube of relatively tough flexible material, said tube enclosing the capsule and a material that forms a settable paste when mixed in the presence of air with the fluid in the capsule, and a rip cord embedded in an end wall of the tube.

References Cited in the file of this patent
UNITED STATES PATENTS

| | | |
|---|---|---|
| 1,318,254 | Andresen | Oct. 7, 1919 |
| 1,782,938 | Pletcher | Nov. 25, 1930 |
| 2,015,972 | Sodergren | Oct. 1, 1935 |
| 2,052,158 | Zink | Aug. 25, 1936 |
| 2,185,536 | Borland et al. | Jan. 2, 1940 |
| 2,452,273 | Van Sant | Oct. 26, 1948 |
| 2,562,402 | Winsten | July 31, 1951 |
| 2,619,087 | Oclassen | Nov. 25, 1952 |
| 2,676,591 | Fox | Apr. 27, 1954 |